United States Patent
Huh et al.

(10) Patent No.: US 9,681,038 B2
(45) Date of Patent: Jun. 13, 2017

(54) MOBILE TERMINAL AND METHOD FOR SETTING A FOCAL POINT VALUE

(71) Applicant: LG ELECTRONICS INC., Seoul (KR)

(72) Inventors: Hyungmoo Huh, Seoul (KR); Kyuyeol Chae, Seoul (KR); Jaehyun Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/735,545

(22) Filed: Jun. 10, 2015

(65) Prior Publication Data

US 2016/0080631 A1    Mar. 17, 2016

(30) Foreign Application Priority Data

Sep. 15, 2014 (KR) .................. 10-2014-0122233
Sep. 15, 2014 (KR) .................. 10-2014-0122238

(51) Int. Cl.
*H04N 5/232* (2006.01)
*H04N 5/44* (2011.01)

(52) U.S. Cl.
CPC .......... *H04N 5/23212* (2013.01); *H04N 5/44* (2013.01)

(58) Field of Classification Search
CPC ...... H04N 5/23212; H04N 5/44; H04N 5/232; H04N 5/23245; H04N 5/3696; H04N 9/045; H04N 9/77; H04N 2101/00; G02B 7/285; G02B 7/36; G02B 7/28; G03B 13/36
USPC ....................................... 348/349
See application file for complete search history.

(56) References Cited

U.S. PATENT DOCUMENTS

| | | | |
|---|---|---|---|
| 8,730,374 B2 * | 5/2014 | Sugawara | G02B 7/285 348/231.3 |
| 2003/0189662 A1 | 10/2003 | Matsuda | |
| 2004/0170419 A1 | 9/2004 | Taka | |
| 2009/0067828 A1 * | 3/2009 | Ono | G02B 7/102 396/128 |
| 2012/0092545 A1 | 4/2012 | Sugawara | |

(Continued)

FOREIGN PATENT DOCUMENTS

EP    1 351 086 A2    10/2003
JP    2008-152150 A    7/2008

OTHER PUBLICATIONS

Partial European Search Report issued in Application No. 15002184.8 dared Jan. 21, 2016.

(Continued)

*Primary Examiner* — Pritham Prabhakher
(74) *Attorney, Agent, or Firm* — KED & Associates LLP

(57) ABSTRACT

A mobile terminal for capturing an image and a method for controlling the same are provided. The mobile terminal includes a camera unit configured to receive an external image and process the received image to an image frame, and a control unit configured to set a focal point value of the image frame received from the camera unit, wherein the focal point value is a focal point value obtained by correcting a first focal point value extracted according to a first scheme of detecting a focal point value by using a phase difference of the image by using a second focal point extracted according to a second scheme of detecting a focal point by using a comparison value of the image.

12 Claims, 14 Drawing Sheets

(56) References Cited

U.S. PATENT DOCUMENTS

| | | | | |
|---|---|---|---|---|
| 2012/0113313 A1* | 5/2012 | Egawa | .................. | G03B 13/36 |
| | | | | 348/345 |
| 2012/0281130 A1 | 11/2012 | Kudo et al. | | |
| 2013/0044246 A1* | 2/2013 | Shintani | .................. | G02B 7/28 |
| | | | | 348/294 |
| 2013/0215319 A1* | 8/2013 | Tomita | .................... | G02B 7/28 |
| | | | | 348/345 |
| 2014/0085511 A1* | 3/2014 | Toida | ................. | H04N 5/2625 |
| | | | | 348/239 |
| 2014/0354875 A1* | 12/2014 | Ogawa | ............... | H04N 5/23212 |
| | | | | 348/349 |

OTHER PUBLICATIONS

European Search Report dated Apr. 11, 2016 issued in Application No. 15002184.8.

* cited by examiner

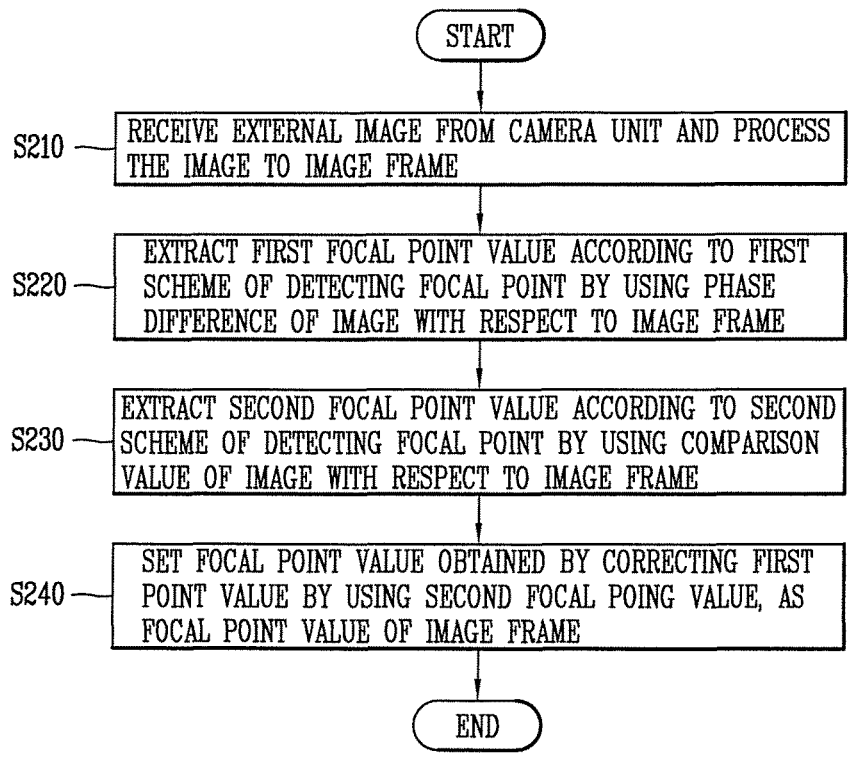
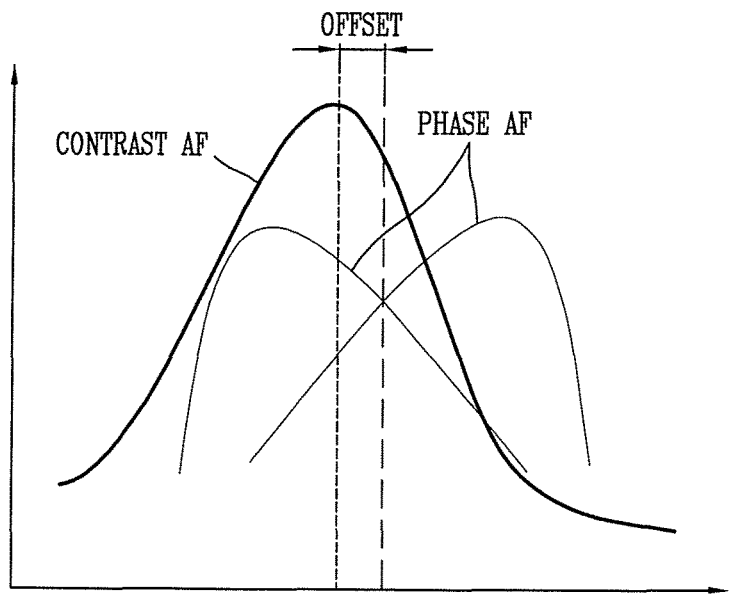

FIG. 11A
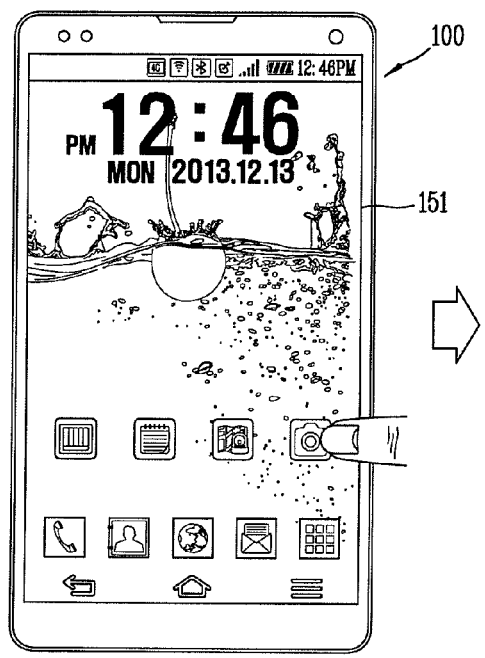
FIG. 11B
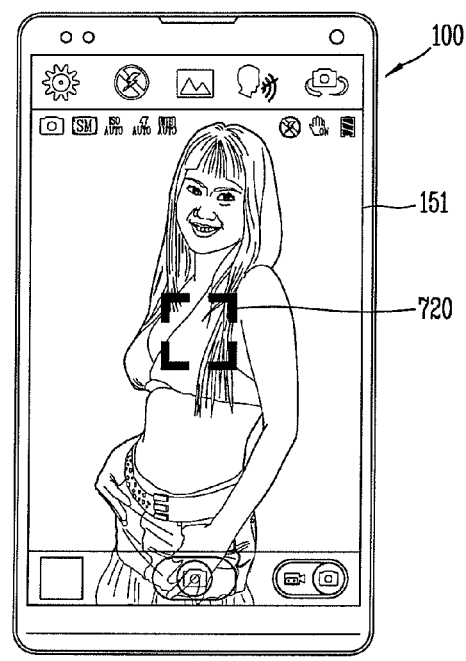
FIG. 11C
| -2 | -2 | -3 |
|----|----|----|
| -1 | 0  | -1 |
| -3 | -1 | -3 |
| -6 | -3 | -5 |

FIG. 12A  FIG. 12B
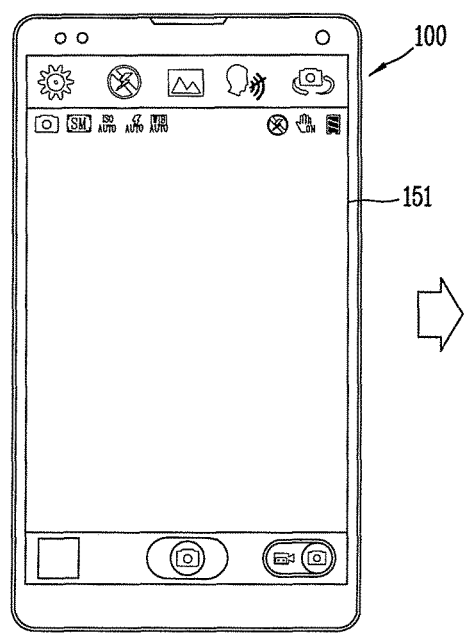
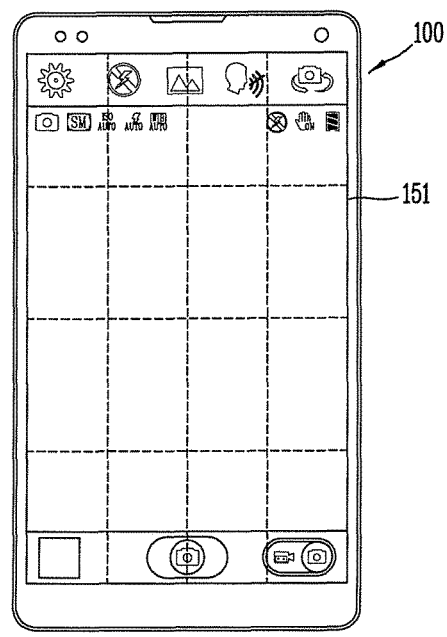
FIG. 12D  FIG. 12C
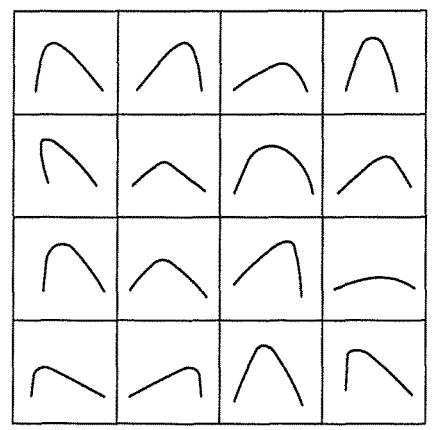

FIG. 13A
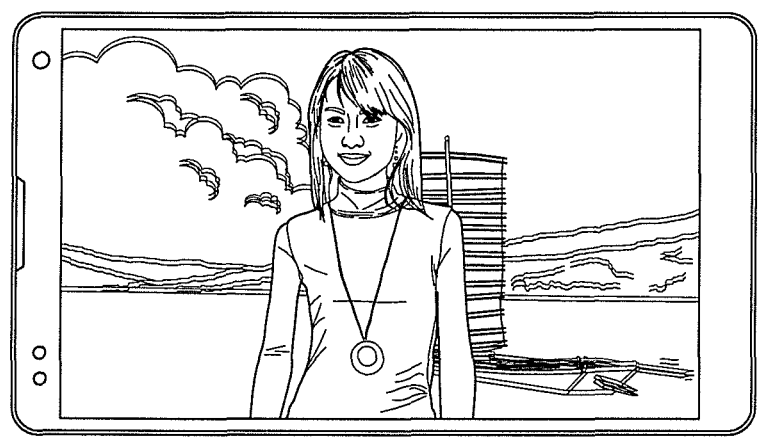
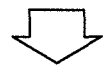

FIG. 13B
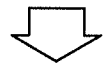

MOBILE TERMINAL AND METHOD FOR SETTING A FOCAL POINT VALUE

CROSS-REFERENCE TO RELATED APPLICATION

This application claims priority under 35 U.S.C. §119 to Korean Application Nos. 10-2014-0122233 and 10-2014-0122238 filed in Korea on Sep. 15, 2014, whose entire disclosures are hereby incorporated by reference.

BACKGROUND

1. Field

The present disclosure relates to a mobile terminal capable of capturing an image and a method of controlling the same.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, a method of automatically adjusting a focal point value and utilizing the automatically adjusted focal point value, when an image is captured through a camera, is yet to be introduced.

SUMMARY OF THE INVENTION

Therefore, an aspect of the detailed description is to provide a method of utilizing information obtained by automatically adjusting a focal point value when an image is captured through a camera.

Another aspect of the detailed description is to provide a method of changing a focal point of a captured image.

To achieve these and other advantages and in accordance with the purpose of this specification, as embodied and broadly described herein, a mobile terminal includes: a camera unit configured to receive an external image and process the received image to an image frame; and a control unit configured to set a focal point value of the image frame received from the camera unit, wherein the focal point value is a focal point value obtained by correcting a first focal point value extracted according to a first scheme of detecting a focal point value by using a phase difference of the image, by using a second focal point extracted according to a second scheme of detecting a focal point by using a comparison value of the image.

In an exemplary embodiment of the present disclosure, the control unit may correct an error of the first focal point value by calculating a difference value between the first focal point value and the second focal point value.

In an exemplary embodiment of the present disclosure, the mobile terminal may further include: a memory unit configured to store focal point information related to setting a focal point, wherein the control unit may determine accuracy of the first focal point value extracted according to the first scheme by using the focal point information.

In an exemplary embodiment of the present disclosure, the focal point information related to setting a focal point may be a difference value between the first focal point value and the second focal point value, and a plurality of previously calculated difference values may be stored in the memory unit.

In an exemplary embodiment of the present disclosure, the control unit may determine accuracy of the first focal point value based on the plurality of difference values stored in the memory unit, and when the accuracy is equal to or higher than a preset level, the control unit may set the first focal point value as a focal point value of the image frame.

In an exemplary embodiment of the present disclosure, when the accuracy is equal to or higher than the preset level, the control unit may not correct the error of the first focal point value.

In an exemplary embodiment of the present disclosure, when the accuracy is equal to or higher than the preset level, the control unit may not extract the second focal point value any longer.

In an exemplary embodiment of the present disclosure, the mobile terminal may further include: a touch screen unit configured to display the image frame received from the camera unit, wherein the control unit may display graph objects respectively representing the first focal point value and the second focal point value on the touch screen unit such that the graphic objects are visually differentiated.

In an exemplary embodiment of the present disclosure, when a preset type of touch is applied to the graphic objects, the control unit may correct an error of the first focal point value by using the second focal point value.

In an exemplary embodiment of the present disclosure, the control unit may display the graphic object representing the error-corrected first focal point value on the touch screen unit.

In an exemplary embodiment of the present disclosure, when the image is received from the camera unit, the control unit may correct an error of the first focal point value in the background.

In an exemplary embodiment of the present disclosure, when the first focal point value and the second focal point value are identical, the control unit may set the focal point of the image frame to a first focal point value.

In an exemplary embodiment of the present disclosure, when the first focal point value and the second focal point value are different, the control unit may output notification information indicating that error correction is required to the touch screen unit.

To achieve these and other advantages and in accordance with the purpose of this specification, as embodied and broadly described herein, a method for controlling a mobile terminal, includes: receiving an external image from a camera unit and processing the received image to an image frame; extracting a first focal point value of the image frame according to a first scheme of detecting a focal point value by using a phase difference of the image; extracting a second focal point value of the image frame according to a second scheme of detecting a focal point by using a comparison value of the image; and setting a focal point value obtained by correcting the first focal point value by using the second focal point value to a focal point value of the image frame, wherein in the setting of the focal point value, when the first focal point value has accuracy equal to or higher than a preset level, correction of the first focal point value is not performed.

In an exemplary embodiment of the present disclosure, the first focal point value may be corrected by using a difference value between the first focal point value and the second focal point value.

In an exemplary embodiment of the present disclosure, the method may further include: storing the difference value between the first focal point value and the second focal point value in a memory unit; and calculating accuracy of the first focal point value by using the difference value stored in the memory unit.

In an exemplary embodiment of the present disclosure, when the calculated accuracy is equal to or higher than the preset level, correction of the first focal point value may not be performed.

In an exemplary embodiment of the present disclosure, when the calculated accuracy is equal to or higher than the preset level, extracting of the second focal point value may not be performed.

In an exemplary embodiment of the present disclosure, when the calculated accuracy is equal to or higher than the preset level, the first focal point value may be set as a focal point value of the image frame.

In an exemplary embodiment of the present disclosure, in a state in which the image frame is displayed on the touch screen unit, when the first focal point value is corrected, a graphic object representing the first focal point value may be output onto the image frame.

To achieve these and other advantages and in accordance with the purpose of this specification, as embodied and broadly described herein, a mobile terminal includes: a camera configured to process an external image to an image frame; a touch screen configured to display the image frame; and a control unit configured to detect a focal point value of the image frame in a state in which the image frame is displayed on the touch screen, wherein, in a state in which the image is displayed, the control unit may capture the image with the detected focal point value based on a received image capture command, and when the image is captured, the control unit may store focal point information indicating a log regarding focal points of the image frame detected for a preset period of time based on the a point in time at which the image was captured, together with the captured image.

In an exemplary embodiment of the present disclosure, the focal point information may be a log regarding focal points of the image frame detected from a point in time at which the image frame was received to a point in time at which the image frame was captured.

In an exemplary embodiment of the present disclosure, the control unit may detect a focal point of the image frame by using a phase difference of the image frame or by using a comparison value of the image frame.

In an exemplary embodiment of the present disclosure, the control unit may divide the image frame into a plurality of regions, and store focal point information of each of the plurality of regions.

In an exemplary embodiment of the present disclosure, the focal point information may indicate a log regarding focal points detected by the plurality of regions.

In an exemplary embodiment of the present disclosure, the control unit may output at least one graphic object representing the focal point information in an overlapping manner on the captured image frame.

In an exemplary embodiment of the present disclosure, when any one of at least one graphic object is selected, the control unit may change a focal point value of the captured image frame into a focal point value represented by the selected graphic object.

In an exemplary embodiment of the present disclosure, when the focal point value of the captured image frame is changed into a focal point value represented by the selected graphic object, the control unit may process the region indicated by the focal point value and a region other than the region indicated by the focal point value such that the regions are visually differentiated.

To achieve these and other advantages and in accordance with the purpose of this specification, as embodied and broadly described herein, a method for controlling a mobile terminal, includes: receiving an external image from a camera and processing the received image to an image frame; displaying the processed image frame on a touch screen; in a state in which the image frame is displayed on the touch screen, detecting a focal point value of the image frame; when an image capture command is received, capturing the external image with the detected focal point value; and after the image is captured, storing focal point information indicating a log regarding focal points of the image frame detected for a preset period of time based on a point in time at which the image was captured, together with the captured image.

In an exemplary embodiment of the present disclosure, the focal point of the image frame may be detected by using a phase difference of each region or by using a comparison value of the image frame, the focal point information may indicate a log regarding focal points detected from a point at which the image frame was received from the camera and the point in time at which the image was captured, and the detected focal point value of the captured image may be changed to a different focal point value by using the focal point information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The embodiments will be described in detail with reference to the following drawings in which like reference numerals refer to like elements wherein:

FIG. 2 is a flow chart illustrating a method of setting focus in a mobile terminal according to an exemplary embodiment of the present disclosure.

FIG. 3 is a graph illustrating a control method of FIG. 2.

FIGS. 11A, 11B and 11C are conceptual views illustrating the control method of FIG. 10.

FIGS. 12A, 12B, 12C and 12D are conceptual views illustrating shapes in which focal point information of an image divided into a plurality of regions is stored.

FIGS. 13A and 13B are conceptual views illustrating a method of utilizing focal point information.

DETAILED DESCRIPTION

Figure 1A:
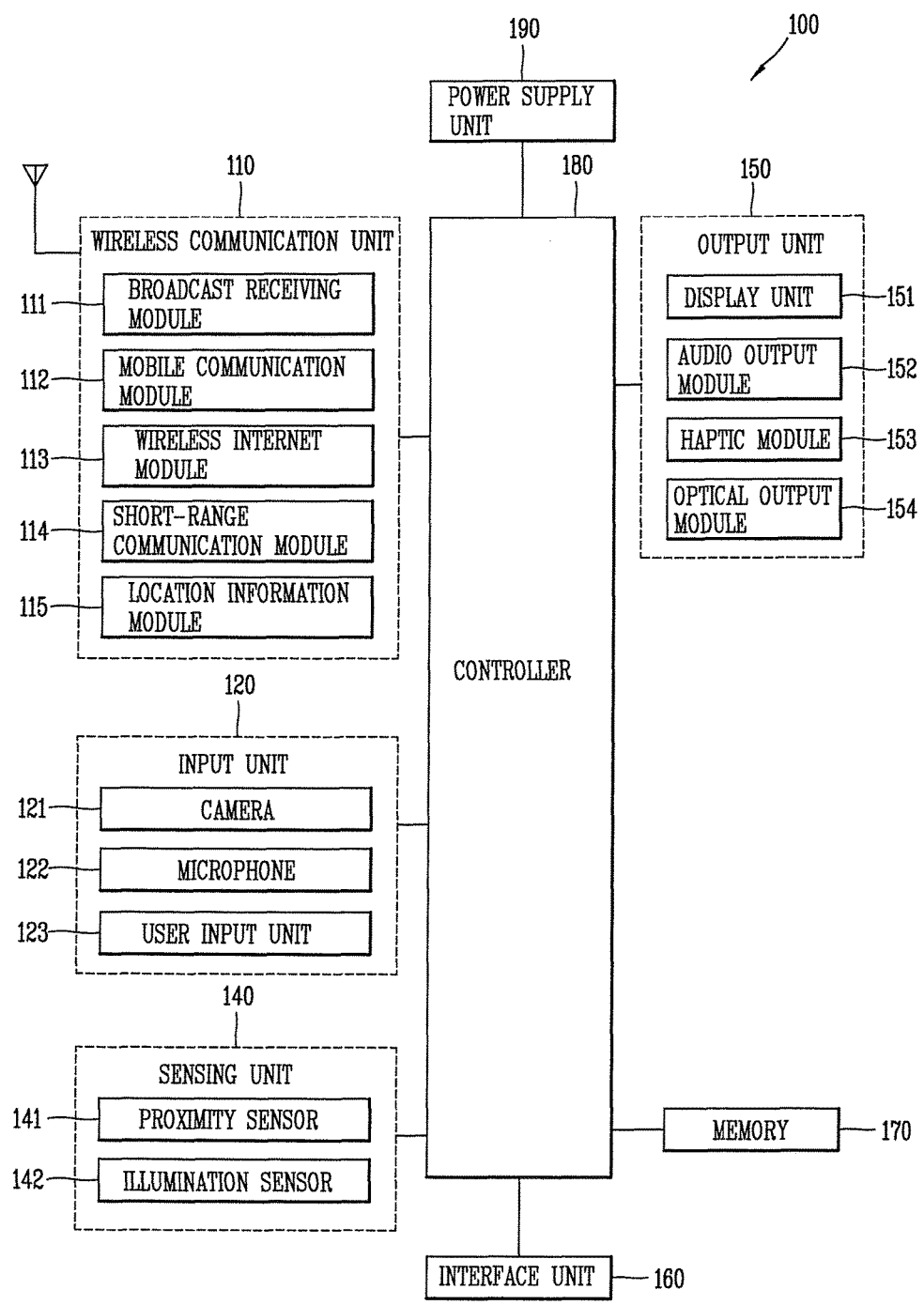
FIG. 1A is a block diagram of a mobile terminal according to an exemplary embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
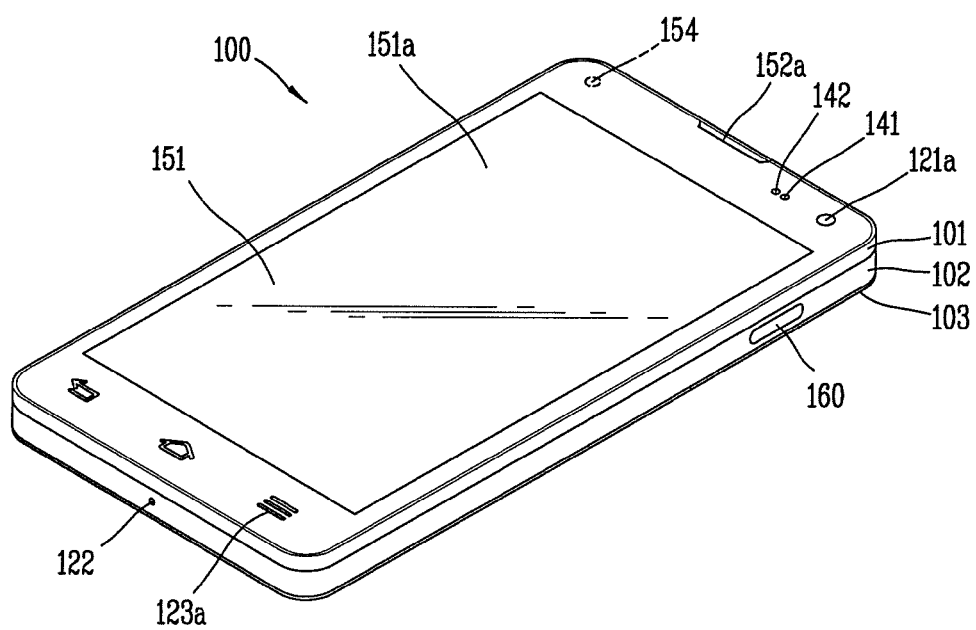
FIGS. 1B and 1C are conceptual views of one example of the mobile terminal, viewed from different directions.
Figure 1C:
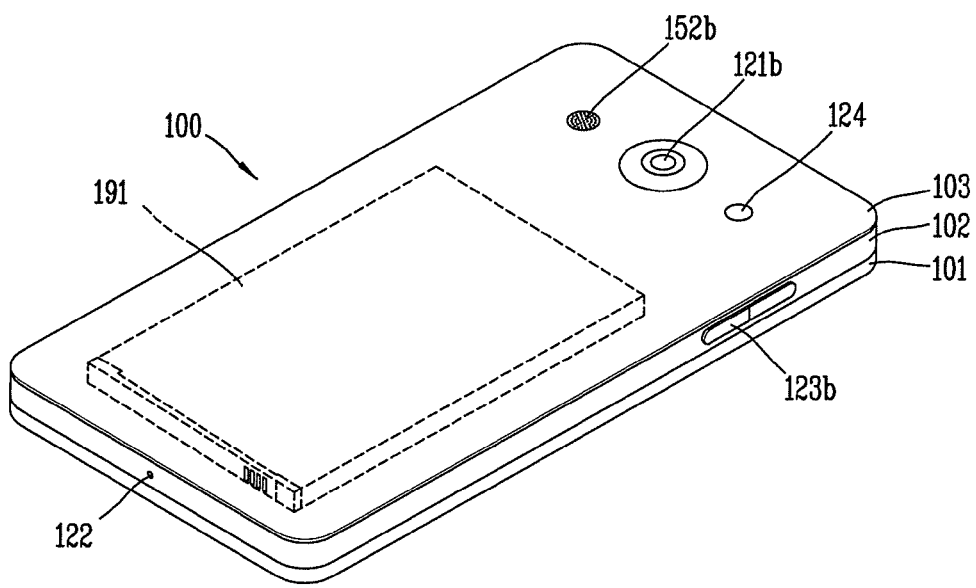

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Description will now be given in detail of the exemplary embodiments, with reference to the accompanying drawings. For the sake of brief description with reference to the drawings, the same or equivalent components will be provided with the same reference numbers, and description thereof will not be repeated.

In the present disclosure, a camera disposed on a front surface of the terminal body 100 will be referred to as a front camera 121a, and a camera disposed on a rear surface of the terminal body 100 will be referred to as a rear camera 121b. Also, in the case of an embodiment in which both the front camera 121a and the rear camera 121b are applicable, the front camera 121 and the rear camera 121 will be simply referred to as a camera 121.

Hereinafter, a mobile terminal having a camera capable of automatically adjusting focus will be described in detail. FIG. 2 is a flow chart illustrating a method of setting focus in a mobile terminal according to an exemplary embodiment of the present disclosure. FIG. 3 is a graph illustrating a control method of FIG. 2.

The mobile terminal according to an exemplary embodiment of the present disclosure may include the camera 121 (or camera unit) configured to receive an external image and processing the received image to an image frame, a control unit 180 configured to set a focal point value of the image frame received from the camera 121, and a display unit 151 (or a touch screen unit) configured to visually display the image frame.

The camera 121 may be activated by a control command received from the user. Here, activation of the camera 121 may refer to a state in which an image is received from an image sensor provided in the camera 121.

Here, the camera 121 may be activated by executing a camera application related to capturing an image by using the camera 121. The camera application may be installed in advance when the mobile terminal is released from the factory or a user may selectively download the camera application from an external server (e.g., an application market, etc.) and install the downloaded camera application in the mobile terminal.

When the image frame is received from the camera 121, a focal point value of the image frame may be set. Here, the focal point may refer to a point (or region) most clearly appearing in an image when the image is captured by using the camera 121.

The focal point value may be automatically set by the control unit 180 or may be manually set by the user. Whether to automatically or manually set the focal point value may be selected by the user.

In a case in which it has been set such that the focal point value is to be automatically set, the control unit 180 may calculate a focal point value of an image received from the camera 121 by using a preset scheme. Here, the preset scheme may be a scheme (for example, a phase detection AF (PDAF) scheme) of detecting a focal point value by using a phase difference of an image, a scheme (for example, contrast AF (CAF)) of detecting a focal point value by using a contrast value of an image, and the like, which are generally used.

Also, in a case in which it has been set such that the focal point value is to be manually set, the control unit 180 may directly receive focal point information from the user. For example, in a state in which the image received from the camera 121 is output on the display unit 151, the user may apply a touch to a region in which his or her desired object is displayed, to thus set the touch-applied region as a focal point value.

Hereinafter, a method of calculating a focal point value by the control unit 180 using a pre-set scheme in the case in which it has been set such that the focal point value is to be automatically set will be described in detail.

First, in the mobile terminal according to an exemplary embodiment of the present disclosure, an external image may be received from the camera 121 and processed to an image frame in step S210.

Here, the external image processed to the image frame may be a video or a still image. Also, the image frame may be displayed on the display unit 151 (which may also be referred to as a touch screen unit, and hereinafter, the display unit will be generally used).

Next, the mobile terminal according to an exemplary embodiment of the present disclosure may extract a first focal point value according to a first scheme of detecting a focal point value by using a phase difference of an image with respect to the image frame.

Here, the camera 121 according to an exemplary embodiment of the present disclosure may further include a slit on the image sensor with pixels. Here, the slit is a tool for detecting a phase difference of an image. In detail, the control unit 180 may detect a phase difference of light received by both sides of the slit.

The structure of the image sensor will be described in detail. A cell provided in the image sensor may include a pixel and a slit. For example, in a case in which a cell has a size of 1.12 micrometers (μm), the image sensor may have a slot having a size of 0.56 micrometers (μm).

The control unit 180 may detect a phase difference of an image through the slit structure, and extract a first focal point value by using the detected phase difference. This first scheme is advantageous in that a focal point value is simply extracted by detecting a phase difference of light received from the camera 121, and thus, the focal point value is quickly extracted. Thus, when an image is captured by the camera 121 of the mobile terminal, an image can be captured promptly.

However, due to a physical limitation of the mobile terminal, it is difficult to detect an accurate phase difference. Thus, if the accurate phase difference is not detected, the control unit 180 may extract an erroneous focal point value, and thus, the user may not be able to obtain a desired image.

In order to solve the problem, in the mobile terminal according to an exemplary embodiment of the present disclosure, a second focal point may be extracted according to a second scheme of detecting a focal point value by using a comparison value of an image based on the first focal point value in step S230.

According to the second scheme, since a comparison value of an image is detected and a focal point value is extracted by using the comparison value, a high level of accuracy can be obtained, but it takes long time to extract a focal point value.

By using the second scheme, the control unit 180 may further detect comparison values of an image based on the first focal point value. Here, the control unit 180 may detect comparison values of an image on the periphery of the region in which the first focal point value has been set, rather than detecting comparison values of the entire image. The peripheral region may be a region having a preset size.

The control unit 180 may detect a comparison value of an image of the peripheral region and detect a second focal point value. In this case, the focal point value can be detected even faster than a process of detecting focal point values with respect to the entire image.

Thereafter, in the mobile terminal according to an exemplary embodiment of the present disclosure, the first focal point value may be corrected by using the second focal point value, and a corrected focal point value may be set as a focal point value of the image frame in step S240.

The control unit 180 may compare the calculated first focal point value and the second focal point value. Here, when the first focal point value and the second focal point value are identical, the control unit 180 may set the first focal point value as a focal point value focal point value of the image frame received from the camera 121.

However, when the first focal point value and the second focal point value are not identical, the control unit 180 may correct the first focal point value by using the second focal point value.

In detail, the control unit 180 may calculate an error between the first focal point value and the second focal point value focal point value. Here, the error between the first focal point value and the second focal point value may be set as an offset value. For example, referring to FIG. 3, the control unit 180 may detect an offset value between the first focal point value detected by using the phase difference and the second focal point value detected by using a comparison value of an image.

Here, the first focal point value may be an intersecting point where at least two graphs detected according to the first scheme are met. Also, the second focal point value may be a vertex of the graph detected according to the second scheme. Also, the offset value may be a difference value between an x value of the intersecting point and an x value of the vertex.

Here, the control unit 180 may correct the first focal point value by using the offset value. In this manner, in an exemplary embodiment of the present disclosure, the error of the first focal point value detected by using a phase difference may be corrected.

That is, in an exemplary embodiment of the present disclosure, in order to increase accuracy of the first focal point value detected by using a phase difference, the second focal point value is further detected by using a comparison value of an image based on the first focal point value, and the first focal point value may be corrected by using the second focal point value.

Also, in detecting the focal point, in an exemplary embodiment of the present disclosure, the focal point value can be more rapidly detected by using log information of a previously detected focal point value. Here, the log information may include previously detected offset value information.

In detail, after the first focal point value is detected, the control unit 180 may correct the first focal point value by using the offset value information included in the previous log information. That is, before the second focal point value is extracted according to the second scheme, the first focal point value may first be corrected in advance. In this manner, according to an exemplary embodiment of the present disclosure, the first focal point value with higher accuracy can be obtained.

Thereafter, the control unit 180 may detect the second focal point value based on the corrected first focal point value, and recorrect the corrected first focal point value by using the detected second focal point value. In this case, in an exemplary embodiment of the present disclosure, since the second focal point value is obtained based on the corrected first focal point value having a higher degree of accuracy after correction than in the case in which the focal point value is obtained based on the first focal point value before being corrected, time for calculating the second focal point value can be saved.

In addition, in an exemplary embodiment of the present disclosure, when it is determined that it is not necessary to correct the first focal point value by using the second focal point value by using the previous log information, the second focal point value may not be detected any further. That is, the step of detecting a focal point value by using the second scheme may be omitted, and a focal point value may be obtained by using only the first scheme. For example, a case in which it is determined that correction using the second focal point value is not required may refer to a case in which the offset value, a difference value, between the first focal point value and the second focal point value is equal to or smaller than a preset value.

This is because, if the offset value of the first focal point value is sufficiently small through the previous log information, it is determined that accuracy of the first focal point value is high and correction through the second scheme is not required any longer.

Thus, a focal point value can be obtained more rapidly by using the log information, compared with the scheme of obtaining the focal point value by combining the first existing first scheme and second scheme each time.

Figure 4:
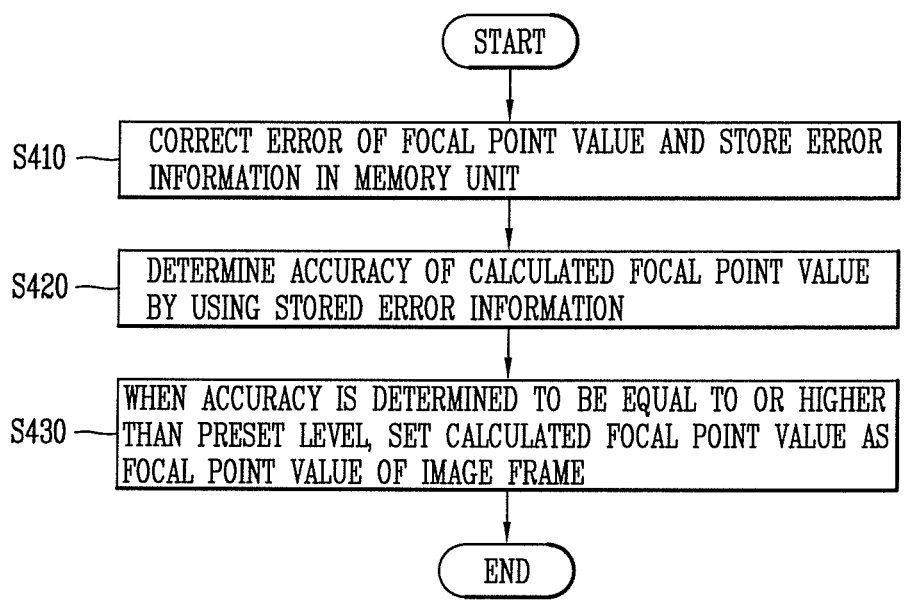
FIG. 4 is a flow chart illustrating a method of storing log information (or history information).

Hereinafter, a method of storing previous log information in calculating a focal point value will be described in detail. FIG. 4 is a flow chart illustrating a method of storing log information (or history information). FIGS. 5 and 6 are graphs related to the log information.

In detail, in the mobile terminal according to an exemplary embodiment of the present disclosure, when correction of the focal point value is completed, information related to the correction of the focal point value may be stored in the memory unit 170 in step S410. That is, the control unit 180 may store the offset value in the memory unit 170.

When the process of automatically adjusting the focal point value is performed on the image frame received from the camera 121, the control unit 180 may store offset values calculated in each process, as log information (or history information) in the memory unit 170.

Here, the log information may be utilized when a focal point value is detected next time. In detail, when a focal point value detection request is received next time, the control unit 180 may detect a first focal point value by using the first scheme. Here, the control unit 180 may correct the first focal point value detected through the first scheme, by using the offset value included in the log information.

Thereafter, the control unit 180 may detect a second focal point value by using the second scheme based on the corrected first focal point value, and may correct an error by using the corrected first focal point value and the second focal point value detected by using the second scheme, in the same manner as described above.

Here, a new offset value regarding the corrected focal point value and the focal point value detected by using the second scheme may be detected, and the control unit 180 may store the new offset value in the memory unit 170. Also, the new offset value may be used to correct a first focal point value when a focal point value is detected next time.

That is, as described above, in an exemplary embodiment of the present disclosure, the offset value information used for detecting a focal point previously may be utilized to detect a focal point value next time. In detail, in an exemplary embodiment of the present disclosure, a focal point value may be corrected through previous log information. In addition, in an exemplary embodiment of the present disclosure, in a case in which accuracy of the first focal point value is increased to be equal to or higher than a pre-set level, correction of the first focal point value using the second focal point value is not performed, whereby the focal point value can be more quickly detected.

Also, after an error of the first focal point value is corrected, the control unit 180 may determine accuracy of the first focal point value by using the log information in step S420. Here, the accuracy of the first focal point value may be calculated by comparing the offset value with a preset reference value. For example, when the offset value is lower than the preset reference value, it is determined that the accuracy of the first focal point value is high, and when the offset value is higher than the preset reference value, it is determined that the accuracy of the first focal point value is low.

Here, in a case in which the accuracy is equal to or higher than the preset reference value, the control unit 180 may not perform the step of correcting the error. Here, the accuracy equal to or higher than the preset level may be previously set or may be set by the user. That is, in a case in which an image is received from the camera after it is determined that the accuracy is equal to or higher than the preset level, the control unit 180 may not detect a second focal point value according to the second scheme, which takes a long time, but set the first focal point value according to the first scheme, as a focal point value of the image.

In this case, a focal point value of the image frame received from the camera 121 may be set as a first focal point value in step S430. That is, in an exemplary embodiment of the present disclosure, log information related to setting a focal point value is stored in the memory 170, and when setting of a focal point value is completed, accuracy of the set focal point value is determined, and when the accuracy is equal to or higher than the preset level, the step of correcting an error may be omitted.

That is, in an exemplary embodiment of the present disclosure, by omitting the step of correcting an error, a focal point value can be more rapidly detected. In addition, in an exemplary embodiment of the present disclosure, since a focal point value is compared by using previous log information, even though the step of correcting an error value is omitted, accuracy of a focal point value can be increased. In this manner, the present disclosure may provide the method of detecting a focal point value quickly as well as increasing accuracy.

Figure 5A:
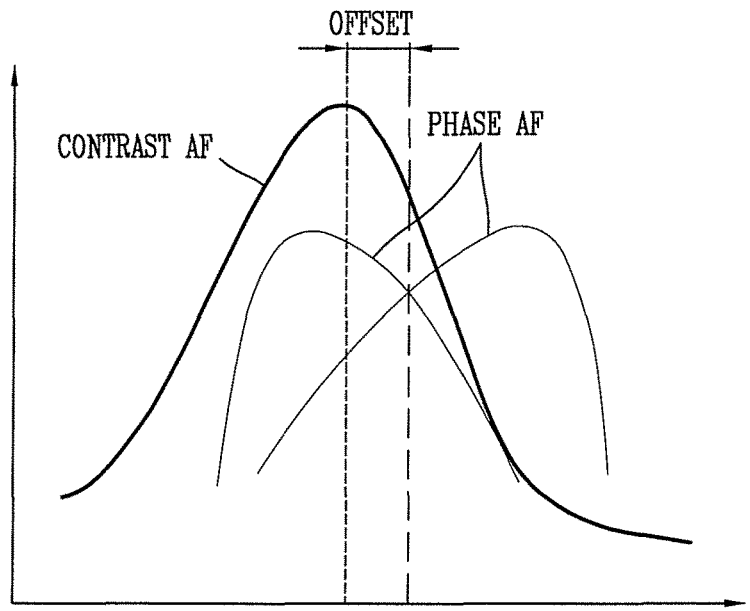
FIGS. 5A, 5B and 6 are graphs related to the log information.
Figure 6:
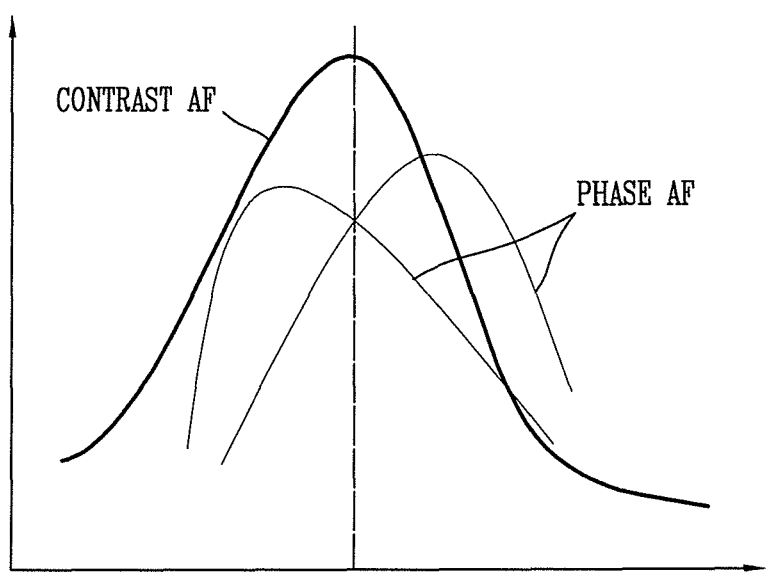

In detail, referring to FIG. 5A, the control unit 180 may detect an offset value with respect to an image. Thereafter, after image capturing with respect to the focal point value is terminated, a new image frame may be received. Here, receiving of the new image frame may refer to a case in which the camera in a deactivated state is activated, an image capture command is received from the user, and an image is received from the camera 121. Here, deactivation of the camera 121 may refer to a state in which an image cannot be received from the camera 121.

In a state in which the camera 121 is deactivated, in an exemplary embodiment of the present disclosure, a control command for activating the camera 121 may be received from the user to activate the camera 121. Here, activation may refer to a case in which an image can be received from the camera 121.

Here, the control unit 180 may perform a step of detecting a focal point of the image received from the camera 121 again. In this case, the control unit 180 may detect an offset value different from a previous one, and may store the different offset value in the memory unit 170.

That is, when the camera 121 is activated, the control unit 180 automatically detects a focal point, and when the camera 121 is deactivated, the control unit 180 may store the offset value. Also, when the camera 121 is activated again by a control command from the user, the control unit 180 may detect a focal point value again.

Figure 5B:
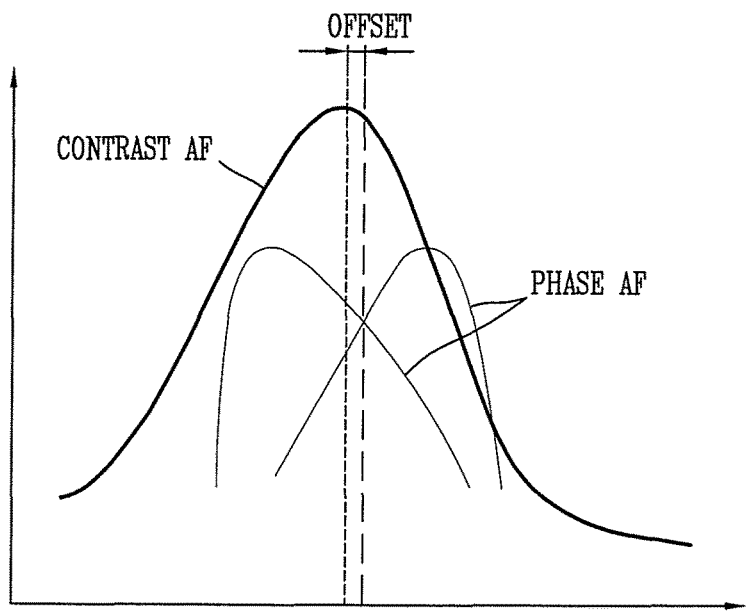

Here, in the case of detecting a focal point value again, the control unit 180 may correct a first focal point value extracted according to the first scheme by using the stored offset value, and compare the corrected first focal point value with a second focal point value extracted by using the second scheme. Here, as illustrated in FIG. 5B, each offset value of the corrected first focal point value and the second focal point value extracted by using the second scheme may be smaller than the previous offset value.

When the process of detecting the focal point value is repeated, as illustrated in FIG. 6, a difference value between the first focal point value extracted according to the first scheme and the second focal point value extracted according to the second scheme may be equal to or smaller than a preset value. For example, the first focal point value and the second focal point value may be identical. Here, when the first focal point value and the second focal point value are identical, accuracy of the first focal point value may be 100%.

In this case, the control unit 180 may determine that the focal point value extracted according to the first scheme is not required to be corrected any further. Thus, when a focal point value is detected thereafter, the process of detecting a focal point value using the second scheme may be omitted. Thus, in an exemplary embodiment of the present disclosure, a time for extracting a focal point value according to the first scheme can be reduced.

In the above, the method of storing log information and utilizing the same has been described in detail. In this manner, the present disclosure can promptly provide an accurate focal point value to the user.

Figure 7A:
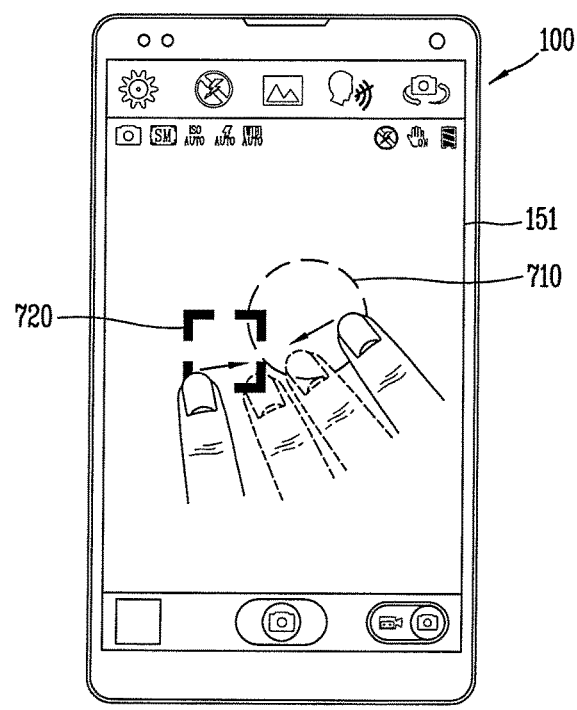
FIGS. 7A and 7B are conceptual views illustrating a method of controlling focal points detected in different manners.
Figure 7B:
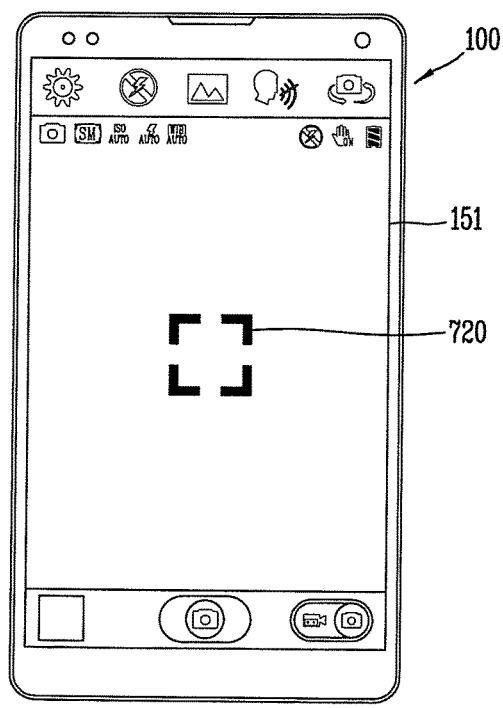
Figure 8A:
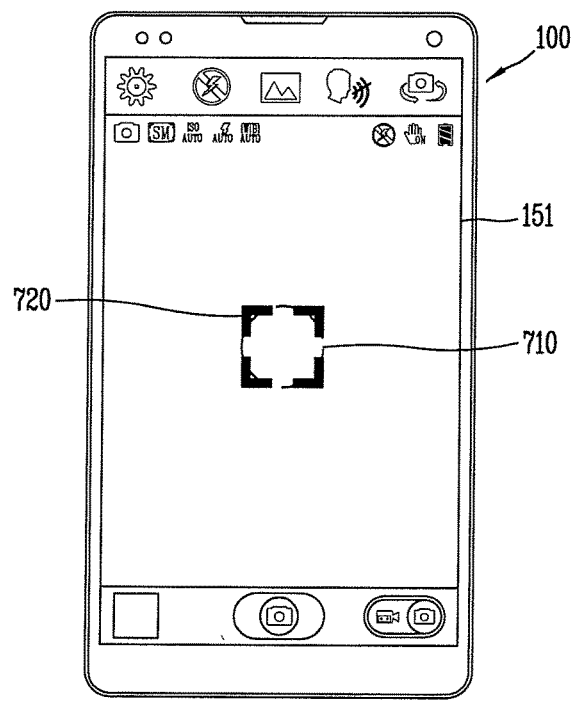
FIGS. 8A and 8B are conceptual views illustrating a control method when focal points detected in different manners have an identical value.
Figure 8B:
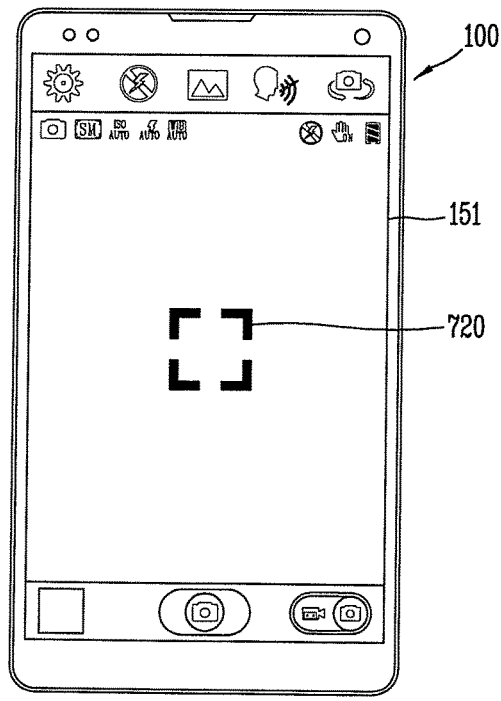

Hereinafter, a method of visually displaying a method of automatically adjusting a focal point value will be described. FIGS. 7A and 7B are conceptual views illustrating a method of controlling focal points detected in different manners. FIGS. 8A and 8B are conceptual views illustrating a control method when focal points detected in different manners have an identical value.

When an image is received from the camera 121, the control unit 180 may display an image frame of the received image on the display unit 151. Here, the control unit 180 may detect a focal point value with respect to the image frame.

Here, the control unit 180 may detect the focal point value with respect to the image frame according to at least two schemes. As described above, the control unit 180 may detect a focal point value according to a first scheme and a second scheme.

Here, the control unit 180 may output a graphic object indicating the first focal point value according to the first scheme and a graphic object indicating the second focal point value according to the second focal point value on the image frame in an overlapping manner. Here, the graphic object indicating the first focal point value and the graphic object indicating the second focal point value may be displayed to be visually differentiated. For example, as illustrated in FIG. 7A, the control unit 180 may output the first focal point value, as a graphic object 720 having a square shape and the second focal point value, the graphic object 710 to the display unit 151.

Here, the control unit 180 may temporarily output the graphic object. In detail, when the performing of the control method described above with reference to FIGS. 3 and 4, starting from the point of time at which the image was received is completed, the control unit 180 may not output the graphic object to the display unit 151 any longer. In this case, the user may recognize that a focal point value is being set while the graphic object is being output temporarily. Also, the user may capture the image after the setting of the focal point value is completed.

Meanwhile, unlike the descriptions with reference to FIGS. 3 and 4, when a pre-set type of touch is applied to the graphic objects, the control unit 180 may correct an error by using the focal point values extracted according to the two schemes. Namely, the control unit 180 may perform the error correction after the touch is applied to the graphic objects.

When the error correction step is terminated, the control unit 180 may output a graphic object 720 representing the focal point value after the error correction to the display unit 151. Accordingly, the user may capture an image having the accurate focal point value after the error correction is completed.

Meanwhile, as illustrated in FIG. 8A and FIG. 8B, in a case in which the focal point values extracted according to the first scheme and the second scheme are identical, the control unit 180 may temporarily display the graphic object 710 and the graphic object and 720 respectively representing the first focal point value and the second focal point value and subsequently display only the graphic object 710 representing the first focal point value. Accordingly, the user may recognize that the step of correcting an error of the current focal point value is not performed.

In the above, the case of detecting focal point values by using at least two focal point value detecting methods has been described. Hereinafter, a method of performing a step of correcting an error of a focal point value by a control command from the user will be described. FIGS. 9A, 9B, 9C, and 9D are conceptual views illustrating correcting an error of a focal point value according to a control command from a user.

Figure 9A:
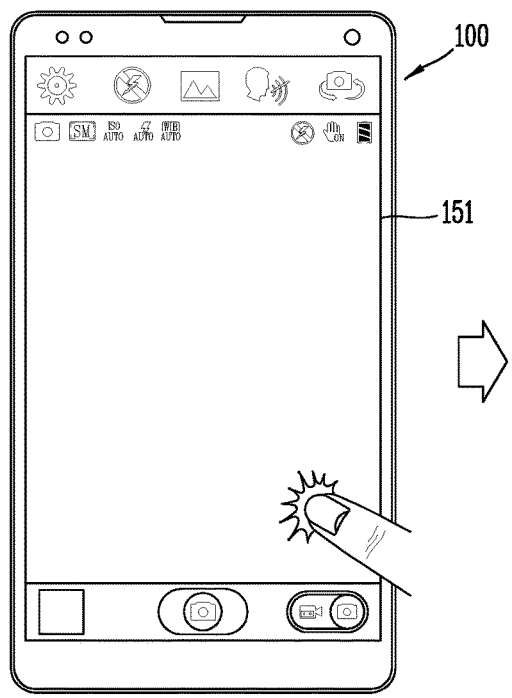
FIGS. 9A, 9B, 9C and 9D are conceptual views illustrating correcting an error of a focal point value according to a control command from a user.

While the image received from the camera unit 121 is being output on the display unit 151, when a pre-set type of touch is applied thereto, the control unit 180 may output a list of items representing functions related to the image. For example, as illustrated in FIG. 9A, the pre-set type of touch may be a double tap input while the image frame is continuously being output on the display unit 151.

Figure 9B:
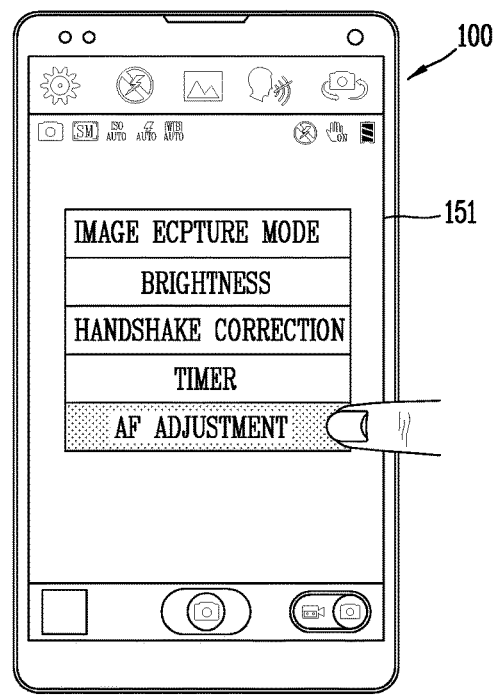

In this case, the list may be displayed on the image being output on the display unit 151. For example, as illustrated in FIG. 9B, the list may include items representing an image capture mode, handshake correction, a timer, and AF adjusting function.

Here, the AF adjusting function may be a function of calculating an offset value through a first focal point value extracted according to the first scheme and a second focal point value extracted according to the second scheme. Here, the calculated offset value may be used to correct an error of the focal point value extracted according to the first scheme.

Also, the AF adjusting function may be used when a step of correcting the first focal point value using the second scheme is not performed as it is determined that the accuracy of the first focal point value extracted according to the first scheme is equal to or higher than a preset level. That is, the AF adjusting function is a function of correcting an error of the current first focal point value again by forcibly performing the step of correcting the error using the second scheme by the user.

Here, the AF adjusting function may be performed in the background of the mobile terminal. Here, performing the AF adjusting function in the background may refer to performing the AF adjusting function in a state in which the user of the mobile terminal does not recognize the execution of the AF adjusting function. Also, when the AF adjusting function is performed in the background, visual information indicating that the AF adjusting is being performed may not be displayed on the display unit 151.

Figure 9D:
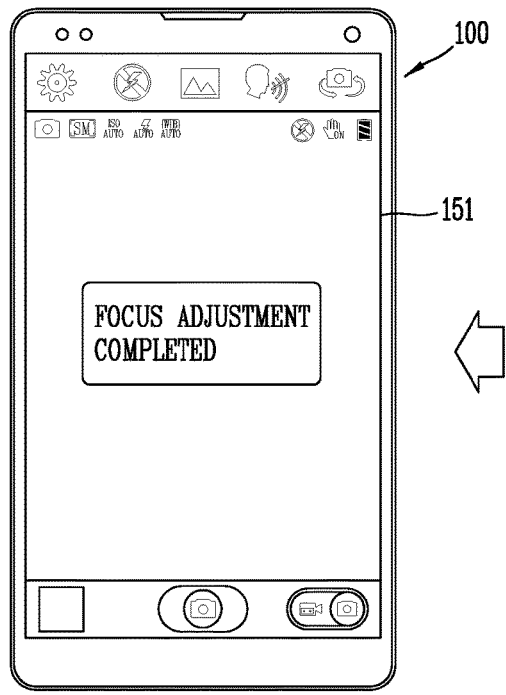
Figure 9C:
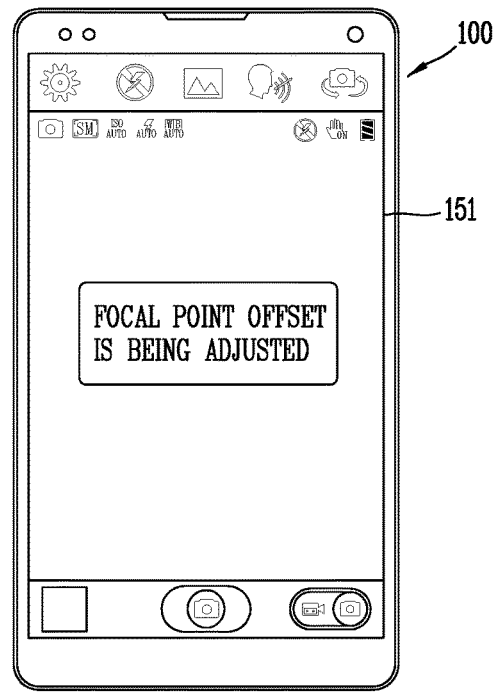

Also, in an exemplary embodiment of the present disclosure, as illustrated in FIG. 9C, notification information indicating that the AF adjusting function is being performed may be output. Accordingly, the user may recognize that AF is being currently adjusted, and thus, it is not possible to capture an image.

In addition, as illustrated in FIG. 9D, in an exemplary embodiment of the present disclosure, when the AF adjusting is completed, notification information indicating that the AF adjusting has been completed may be output. Accordingly, the user may recognize that it is possible to capture an image.

As described above, the method of calculating a focal point value more rapidly and accurately by using previous log information can be provided in calculating a focal point value.

Figure 10:
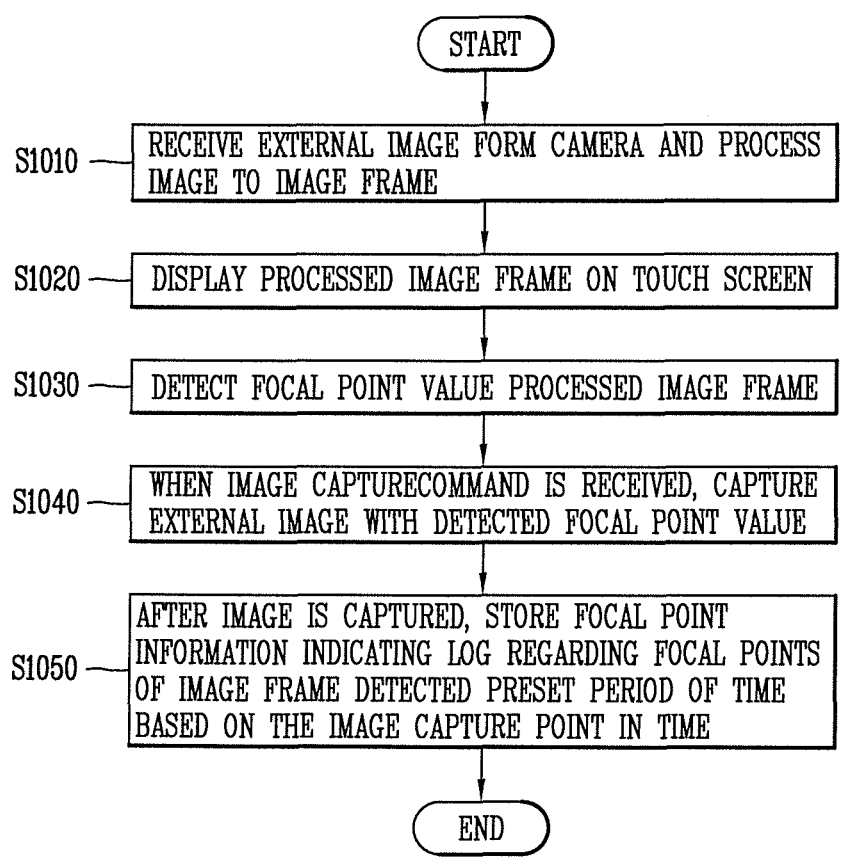
FIG. 10 is a flow chart illustrating a method of utilizing log information related to a detected focal point value.

Also, the mobile terminal capable of capturing an image by automatically adjusting focus can utilize log information of the automatically adjusted focus. Hereinafter, a method of utilizing log information with respect to an image captured by automatically adjusting focus will be described. FIG. 10 is a flow chart illustrating a method of utilizing log information related to a detected focal point value. FIGS. 11A, 11B, and 11C are conceptual views illustrating the control method of FIG. 10.

In the mobile terminal according to an exemplary embodiment of the present disclosure, an external image may be received from the camera 121 and processed to an image frame in step S1010.

The camera 121 may process the image received from the image sensor to an image frame. The camera 121 may be activated when an application related to image capturing is executed. In this case, activation of the camera 121 may refer to a state in which an image can be received from the camera 121.

The execution of the camera application related to capturing an image may be executed according to a user selection of a graphic object representing an application related to capturing of the image.

Thereafter, the mobile terminal according to an exemplary embodiment of the present disclosure may display the processed image frame on the display unit 151 in step S1020. Here, the image frame received in real time from the camera 121 may be displayed on the display unit 151. The user may check the captured image though the image frame displayed on the display unit 151.

In the state in which the image frame is displayed on the display unit 151, the mobile terminal according to an exemplary embodiment of the present disclosure may detect a focal point value with respect to the image frame in step S1030.

Here, the focal point vale may be detected by using the existing method. For example, a phase detecting scheme of detecting a focal point value by using a phase difference of an image, a comparison value scheme of detecting a focal point value by using a comparison value of an image, a hybrid scheme of mixing the phase detecting scheme and the comparison value detecting scheme, and the like, may be used.

Here, the phase detecting scheme is a scheme of setting a position where there is no phase difference of light, as a focal point value, by using a phase difference of light received from the camera 121. In the case of the phase detecting scheme, since a phase difference of light is detected, a focal point value can be promptly detected, compared with the comparison value detecting scheme, but a focal point value is not definite.

Also, the comparison value scheme is a scheme of detecting comparison values of an image with respect to the entire region and setting a region having the highest comparison value to a focal point value. In the comparison value detecting scheme, since a comparison value is used, an accurate focal point value may be detected but it takes a long time for detecting a focal point value.

Also, the hybrid scheme is a scheme of mixing the phase detecting scheme and the comparison value detecting scheme. After detecting rough information through the phase detecting scheme, an accurate focal point value may be detected by using the comparison value detecting scheme based on the detected focal point value. This scheme may use the merits of the phase detecting scheme and the comparison value detecting scheme.

The present disclosure may also be applied to cases of detecting a focal point value through various other schemes. That is, the present disclosure may be applied to cases in which log information related to detection of a focal point value no matter how the focal point value is detected. Also, the scheme of detecting the focal point value may be set when the mobile terminal is released from a factory, or may be set by the user.

Meanwhile, after the focal point value is detected by using any one of the schemes described above, when a command for image capturing is received from the user, capturing of the image frame may be performed by using the detected focal point value in step S1040.

In a state in which the image frame is displayed on the display unit 151, when the command for image capturing is received from the user, the image received from the camera 151 may be performed at the point in time when the command for image capturing is received. In this case, the captured image may be an image having the detected focal point value.

The command for image capturing may be performed according to various schemes such as a touch scheme, a voice scheme, a gesture scheme, and the like. For example, while, the image is being output on the display unit 151, the user may apply a touch to a region in which an image capture button is displayed, thus capturing the image being output at the touched point in time.

When the image is captured, the mobile terminal according to an exemplary embodiment of the present disclosure may store the focal point information indicating a log of detecting a focal point with respect to the image frame together with the captured image for a preset period of time based on the point in time of image capturing in step S1050.

After the image is captured, when a command for storing the image is received from the user, the control unit 180 may store the image and information related to the image in the memory unit 170. The information related to the image may be information including an F number, a shutter speed, and the like, which may also be called EXIF information. Also, after capturing the image, when a command for storing the image is not received from the user, the control unit 180 may not store the image in the memory unit 170. In this case, the control unit 180 may not store the EXIF information.

Here, in an exemplary embodiment of the present disclosure, the EXIF information may include focal point information indicating a log of detecting a focal point.

Meanwhile, the focal point information indicating a log of detecting a focal point may be log information of a focal point detected for a preset period of time based on a point in time at which the image is captured. Here, the preset period of time may be set by the user or may be set in the mobile terminal in advance when the mobile terminal was released from the factory.

For example, the focal point information may be information indicating a log regarding focal points automatically detected from a point in time at which the image was received from the camera 121 to a point in time at which the image was captured. Also, the focal point information may be information indicating a log regarding detected focal points until when an image capturing command is received after the image was captured.

In detail, when the camera 121 is activated and an image is received, the control unit 180 may perform step of detecting a focal point value of the image. Here, the control unit 180 may store values, for example, a phase difference value, or the like, extracted during the process of detecting the focal point.

For example, as illustrated in FIG. 11A, the user may execute an application related to capturing an image. Here, when the application is executed, an image may be received from the camera 121 as illustrated in FIG. 11B.

Here, the control unit 180 may perform a process of detecting a focal point value of the received image, starting from a point in time at which the image is received from the camera 121. For example, the control unit 180 may perform a process of detecting a focal point value by using a phase difference.

Thereafter, the control unit 180 may output a graphic object 720 indicating that a focal point value of the image has been set, to a region indicating the focal point value detected by using the phase difference.

In addition, as illustrated in FIG. 11C, after the image is captured, the control unit 180 may store phase difference values of at least one region previously divided with respect to the image. For example, the control unit 180 may store phase difference values with respect to each of the twelve divided regions. Here, the region having a phase difference value 0 is a region where a focal point value has been set.

Here, in a case in which there is no phase difference, the phase difference value is stored as 0, and the region without a phase difference may be set as a focal point value. Here, when the phase difference value has a positive (+) value, it may indicate that an object is positioned at the front side based on the region in which the phase difference value is 0, and when the phase difference value has a negative (−) value, it may indicate that an object is positioned behind based on the region in which the phase difference value is 0. That is, through the phase difference values, the user may determine relative positions of objects. Also, through the phase difference values, the user may recognize a region in which a focal point of the currently captured image has been set.

Meanwhile, after the image is stored, when an image is continuously received from the camera 121, focal point information until before a command for capturing an image is received after the image is stored may be stored. Here, with respect to the image captured after the image capture command received, focal point information indicating a log regarding focal points detected until before the image capture command was received after the previous image was stored may be stored.

So far, the method of storing focal point information has been described. In the present exemplary embodiment, the method of variously utilizing the focal point information by storing the focal point information until before an image is captured after the camera 121 is activated can be provided.

Hereinafter, a method of storing focal point information with respect to each of a plurality of regions in detecting a focal point will be described in detail. FIGS. 12A, 12B, 12C, and 12D are conceptual views illustrating shapes in which focal point information of an image divided into a plurality of regions is stored.

In the mobile terminal according to an exemplary embodiment of the present disclosure, when a focal point value of an image received from the camera 121 is detected, the image may be divided into a plurality of regions having preset sizes to detect focal point values. The plurality of regions may be referred to as multi-windows. Also, sizes of the preset regions may be changed by the user.

Also, the number of the plurality of regions may be set by the user or may be set in advance. For example, as illustrated in FIG. 12B, the control unit 180 may divide the image into sixteen virtual regions.

When focal point values of the plurality of regions are detected, the user may capture a multi-focal image. Here, the multi-focal image may be an image including at least two or more focal point values.

Meanwhile, the control unit 180 may store focal point information regarding detected focal point values of the plurality of regions. Here, the stored focal point information may be stored in different shapes according to schemes of detecting the focal point values in the memory unit 170.

For example, as illustrated in FIG. 12C, the focal point information may be stored as graph information in each region. Here, the focal point values may be values derived by using a comparison value of the image with respect to each region. Namely, a focal point of each region may be the highest point of the graph in each region. Also, when the graph information is stored, the highest point information related to the graph and shape information of the graph may be stored together in the memory unit 170.

Here, the region including the highest point of the graph may be a region in which an object closest to the camera, among objects included in the image, is displayed. In addition, a region is closer to the highest point of the graph may be interpreted as a region in which an object close to the camera is displayed. Also, the user may infer a relative distance between objects included in the image to a degree by using the shape information of the graph.

In another example, as illustrated in FIG. 12D, the focal point information may be stored as numbers in the memory unit 170. Here, the meaning of the numbers may be interpreted in the same manner as described above with reference to FIGS. 11A, 11B and 11C. For example, a region in which the number is 0 may be a focus-adjusted region, and a region in which the number is negative (−) may be a region relatively far from the camera, compared with the focus-adjusted region.

In this manner, the user may determine a rough relative distance without a complicated algorithm with respect to a 2D image.

So far, the shapes of stored focal point information have been described. In this manner, when a focus is automatically adjusted, the user may store focal point information and utilize it to correct an image later. Also, according to the present exemplary embodiment, focal point information of an image may be promptly and simply detected without a complicated algorithm.

Hereinafter, a method of utilizing stored focal point information will be described in detail. FIGS. 13A and 13B are conceptual views illustrating a method of utilizing focal point information.

In the mobile terminal according to an exemplary embodiment of the present disclosure, when an image is stored, focal point information indicating a log regarding a detected focal point of the image may also be stored together.

Here, the control unit 180 may change a focal point of the captured image by using the focal point information based on a control command received from the user.

Here, when the focal point of the captured image is changed, the control unit 180 may change the captured image to an image that may be displayed when it would have captured with the changed focal point. To this end, characteristics value of the image which is changed together when each focal point is changed may be stored in the memory unit 170. The control unit 180 may convert the image by using the characteristics value of the image corresponding to the change in the focal point value. Here, the characteristics value may be sharpness information of the image, or the like.

In detail, as illustrated in FIG. 13A, the control unit 180 may output any one of a plurality of images stored in the memory unit 170 to the display unit 151. Here, the control unit 180 may change a focal point value of the image by using focal point information stored together with the image.

Namely, in the present exemplary embodiment, a focal point of a captured image can be simply changed by utilizing focal point information stored together, even without executing a complicated algorithm.

For example, referring to FIG. 13A, the image is captured in a state in which a focal point value of a background thereof is not set, and thus, a region of the captured image is displayed to be dim. For example, the region displayed to be dim may be a background region other than the region in which a person is displayed. Here, focal point information may be stored in each of the plurality of regions of the image divided into a plurality of regions.

In this case, when a command for changing a focal point with respect to the image is received, the control unit 180 may change a focal point of the background region such that a focal point value of the image of the background region is changed to an image with a properly set focal point value, by utilizing the focal point information. Here, the control unit 180 may detect a characteristics value of the image which is changed according to the changed focal point value from the memory unit 170.

For example, the control unit 180 may increase sharpness of the image according to the changed focal point value. In detail, as illustrated in FIG. 13A, when a focal point value of the background region is changed, a clear image may be obtained. In this manner, even in a case in which an image out of focus is captured, the user may obtain a clear image by simply changing a focal point value.

Conversely, the control unit 180 may change a focal point value of a region of a clearly displayed image. In detail, the control unit 180 may change a focal point value of a portion of an image captured with an accurate focal point value such that the changed focal point value region is dim. The changing of a clear image to a dim image may be called an out-focusing effect.

For example, as illustrated in FIG. 13B, the control unit 180 may control the display unit 151 to output any one of a plurality of images stored in the memory unit 170. Thereafter, the control unit 180 may change a focal point value of a particular region of the image by using focal point information.

Here, the control unit 180 may reduce sharpness of the image according to the changed focal point value. In detail, as illustrated in FIG. 13B, a particular region of the image may be displayed to be dim. That is, in the present exemplary embodiment, the effect of changing a focal point value of an image can be provided by simply utilizing focal point information without executing a separate algorithm.

In the present exemplary embodiment, after an image is captured, various effects can be provided to the image by using log information of detected auto-focusing of the captured image. Also, when the captured image is out of focus, the focal point of the image may be changed to thus provide a user desired image.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the control unit 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a camera configured to receive an external image, process the received image and provide an image frame; and
   a controller configured to set a focal point value of the image frame,
   wherein the focal point value is set by:
   obtaining a first focal point value according to a first focal point detecting scheme based on a phase difference of the image,
   obtaining a second focal point value according to a second focal point detecting scheme based on a comparison value of the image,
   determining a difference between the first focal point value and the second focal point value,
   determining accuracy based on the determined difference,
   setting the focal point value of the image frame by changing an error of the first focal point value based on the determined difference when the accuracy is determined to be less than a preset level, and
   setting the focal point value as the first focal point value of the image frame when the accuracy is determined to be equal to or greater than the preset level,
   wherein the controller sets the obtaining of the second focal point value not to be performed any longer when the accuracy is determined to be equal to or greater than the preset level,
   wherein in response to a preset type of touch at one of a first and second objects that are displayed on a touch screen, the controller changes the error of the first focal point value based on the second focal point value.

2. The mobile terminal of claim 1, further comprising:
   a memory configured to store the difference between the first focal point valve and the second focal point value.

3. The mobile terminal of claim 2, wherein the memory stores a plurality of previously determined differences.

4. The mobile terminal of claim 1, wherein when the accuracy is determined to be equal to or greater than the preset level, the controller does not change an error of the first focal point value.

5. The mobile terminal of claim 1, further comprising:
   the touch screen configured to display the image frame,
   wherein the controller controls the touch screen to display the first object and the second object, the first object to represent the first focal point value, and the second object to represent the second focal point value, wherein the displayed second object is visually differentiated from the displayed first object.

6. The mobile terminal of claim 5, wherein the controller controls the touch screen to display the object representing the error-changed first focal point value.

7. The mobile terminal of claim 5, wherein when the image is received from the camera, the controller changes the error of the first focal point value in a background of the image.

8. The mobile terminal of claim 5, wherein when the first focal point value is same as the second focal point value, the controller sets the focal point value of the image frame to the first focal point value.

9. The mobile terminal of claim 5, wherein when the first focal point value is different from the second focal point value, the controller controls the touch screen to display notification information relating error correction.

10. A method for controlling a mobile terminal, the method comprising:
    receiving an external image from a camera and processing the received image to provide an image frame;
    obtaining a first focal point value of the image frame according to a first focal point detecting scheme based on a phase difference of the image;
    obtaining a second focal point value of the image frame according to a second focal point detecting scheme based on a comparison value of the image;
    determining a difference between the first focal point value and the second focal point value;
    determining an accuracy based on the determined difference;
    setting the focal point value of the image frame by changing an error of the first focal point value based on the determined difference when the accuracy is determined to be less than a preset level; and
    setting the focal point value of the image frame as the first focal point value, when an accuracy is determined to be equal to or greater than a preset level,
    wherein the obtaining of the second focal value is set not to be performed any longer when an accuracy is determined to be equal to or greater than a preset level,
    wherein in response to a preset type of touch at one of a first and second objects that are displayed on a touch screen, changing the error of the first focal point value based on the second focal point value.

11. The method of claim 10, further comprising:
    storing, in a memory, the difference between the first focal point value and the second focal point value.

12. The method of claim 11, wherein when the image frame is displayed on the touch screen and the first focal point value is changed, the method further comprises displaying on the touch screen, a graphic object representing the first focal point value of the image frame.

* * * * *